United States Patent
Nakamura

[11] Patent Number: 5,978,338
[45] Date of Patent: Nov. 2, 1999

[54] APPARATUS FOR REPRODUCING SHORT LENGTH DATA STORED ON AN OPTICAL DISK

[75] Inventor: Masaru Nakamura, Tokyo, Japan

[73] Assignee: NEC Corporation, Japan

[21] Appl. No.: 08/969,844

[22] Filed: Nov. 13, 1997

[30] Foreign Application Priority Data

Nov. 15, 1996 [JP] Japan .................................. 8-304434

[51] Int. Cl.[6] ...................................................... G11B 7/00
[52] U.S. Cl. ............................... 369/59; 369/48; 369/50; 369/58
[58] Field of Search ................................. 369/48, 47, 58, 369/59; 375/116, 119; 370/105.4; 360/51, 39, 45

[56] References Cited

U.S. PATENT DOCUMENTS

| | | | |
|---|---|---|---|
| 4,754,216 | 6/1988 | Wong | 324/83 |
| 5,237,554 | 8/1993 | Senshu et al. | 369/59 |
| 5,253,243 | 10/1993 | Suzuki | 369/48 |
| 5,297,185 | 3/1994 | Best et al. | 375/116 |
| 5,353,271 | 10/1994 | Abe | 369/48 |
| 5,359,585 | 10/1994 | Tanoue et al. | 369/48 |
| 5,377,178 | 12/1994 | Saito et al. | 369/59 |
| 5,524,103 | 6/1996 | Shimizu et al. | 369/59 |
| 5,619,484 | 4/1997 | Yokota et al. | 369/47 |
| 5,706,265 | 1/1998 | Bang | 369/47 |
| 5,732,056 | 3/1998 | Yanagi | 369/48 |
| 5,742,576 | 4/1998 | Hayashi et al. | 369/47 |
| 5,751,689 | 5/1998 | Hoshino et al. | 369/49 |
| 5,761,171 | 10/1995 | Tobita | 369/59 |
| 5,864,531 | 5/1997 | Horigome | 369/48 |

*Primary Examiner*—Muhammad Edun
*Attorney, Agent, or Firm*—Ostrolenk, Faber, Gerb & Soffen, LLP

[57] ABSTRACT

Recorded data including secondary data independent of the main data, which are recorded on an optical disk being rotated in a constant linear velocity manner or a constant angular velocity manner by a variable clock signal or a clock-locked signal, are read out by computing an average of preamble data bits contained in the secondary data, setting a window value according to the average and detecting data bits following the preamble data, based on the window value, while rotating the disk in an arbitrary disk rotating manner without intervention of a phase-locked loop circuit.

8 Claims, 8 Drawing Sheets

FIG.4 (A)  FIG.4 (B)
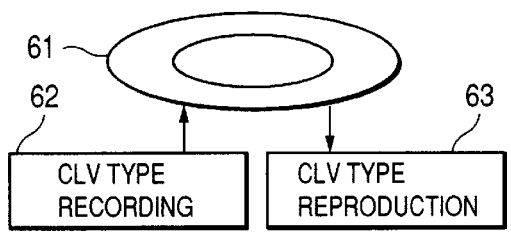
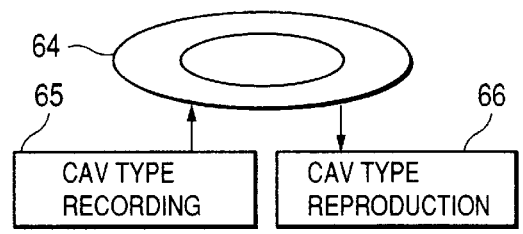
FIG.5
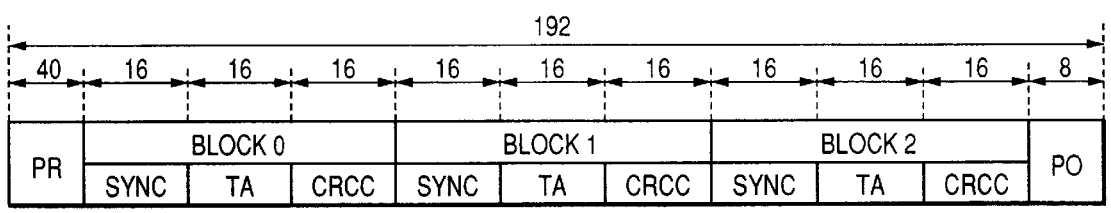
(NUMERAL IN THE FIGURE REPRESENTS THE NUMBER OF BITS)

FIG.8

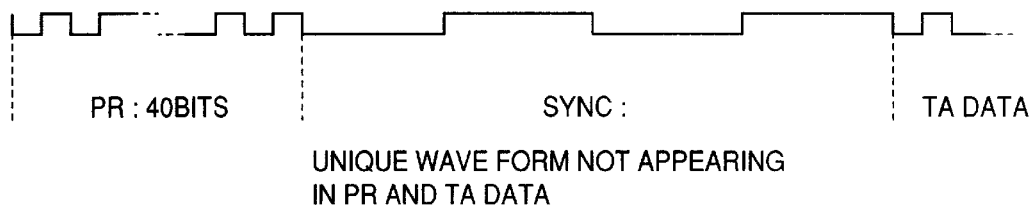

PR : 40BITS        SYNC :        TA DATA

UNIQUE WAVE FORM NOT APPEARING
IN PR AND TA DATA

FIG.9

| PREAMBLE AVERAGE | WINDOW VALUE FOR SYNC (○ OR MORE AND LESS THAN ●) | WINDOW VALUE FOR A 0 DATA BIT (○ OR MORE AND LESS THAN ●) | WINDOW VALUE FOR A 1 DATA BIT (○ OR MORE AND LESS THAN ●) |
|---|---|---|---|
| 4 (3.5 OR MORE AND LESS THAN 4.5) | 14~18 | 3~5 | 1~3 |
| 5 (4.5 OR MORE AND LESS THAN 5.5) | 18~22 | 4~6 | 2~4 |
| 6 (5.5 OR MORE AND LESS THAN 6.5) | 22~26 | 5~7 | 2~4 |
| 7 (6.5 OR MORE AND LESS THAN 7.5) | 26~30 | 6~8 | 3~5 |
| 8 (7.5 OR MORE AND LESS THAN 8.5) | 30~34 | 7~9 | 3~5 |

(NUMERAL IN THE FIGURE REPRESENTS
THE NUMBER OF CLOCK CYCLES)

FIG.10

| PREAMBLE AVERAGE | WINDOW VALUE FOR SYNC (○ OR MORE AND ● LESS THAN) | WINDOW VALUE FOR A 0 DATA BIT (○ OR MORE AND ● LESS THAN) | WINDOW VALUE FOR A 1 DATA BIT (○ OR MORE AND ● LESS THAN) |
|---|---|---|---|
| 8 (7.5 OR MORE AND LESS THAN 8.5) | 30~34 | 7~9 | 3~5 |
| 9 (8.5 OR MORE AND LESS THAN 9.5) | 34~38 | 8~10 | 4~6 |
| 10 (9.5 OR MORE AND LESS THAN 10.5) | 38~42 | 9~11 | 4~6 |
| 11 (10.5 OR MORE AND LESS THAN 11.5) | 42~46 | 10~12 | 5~7 |
| 12 (11.5 OR MORE AND LESS THAN 12.5) | 46~50 | 11~13 | 5~7 |
| 13 (12.5 OR MORE AND LESS THAN 13.5) | 50~54 | 12~14 | 6~8 |
| 14 (13.5 OR MORE AND LESS THAN 14.5) | 54~58 | 13~15 | 6~8 |
| 15 (14.5 OR MORE AND LESS THAN 15.5) | 58~62 | 14~16 | 7~9 |
| 16 (15.5 OR MORE AND LESS THAN 16.5) | 62~66 | 15~17 | 7~9 |

(NUMERAL IN THE FIGURE REPRESENTS THE NUMBER OF CLOCK CYCLES)

5,978,338

APPARATUS FOR REPRODUCING SHORT LENGTH DATA STORED ON AN OPTICAL DISK

BACKGROUND OF THE INVENTION

The present invention relates to a data reproduction apparatus and method for performing reproduction of data from an optical disk.

FIG. 4 is a schematic view showing a common data recording/reproducing system for an optical disk. In the recording and reproduction of data on an optical disk, there are two types of velocity control manners (methods): a constant linear velocity (CLV) method and a constant angular velocity (CAV) method.

The CLV method is referred to as a method which controls a spindle motor according to the position of a disk so that the linear velocity of a data track which is traced by the head is made constant at all times. The CLV method has the advantage that data can be recorded with constant recording density over the entire disk, but on the other hand, since the rotational speed of the disk has to be changed according to the head position, it has the disadvantages that circuitry is increased in size for the speed change control and time is required for searching.

The CAV method is referred to as a method in which the number of revolutions of a spindle motor is always constant. For this reason, the CAV method has the advantages that circuitry can be reduced in size and also searching can be easily performed, because changing the speed of the spindle motor is unnecessary compared with the CLV method. However, the CAV method has the disadvantage that the total amount of recorded data is reduced, because if data is written to both an inner track and an outer track by the same clock signal, a difference in recording density will occur.

Now, a description will be made of a specific reproduction example of data. Each track on an optical disk is usually constituted by a main data area for main data, such as video data, voice data, and system data, and a secondary data area for secondary data such as a track address representing an address of a track. The main data area occupies the greater part of an area on the disk, and even if data of any frequency were reproduced, the data and the clock signal would be extracted through a phase-locked loop (PLL) circuit and therefore the reproduction of the data could be performed.

On the other hand, the secondary data such as a track address is not long enough to be passed through a PLL circuit, because it is constituted by the minimum number of data bits for recording main data as much as possible. However, the track address is a key representing the information of the track, and in the case where the track address is not reproduced correctly, there are cases where the incorrectly reproduced track address will damage the data reproduction processing thereafter. However, in the case where recording and reproduction are performed between the same methods, data of a recorded frequency is reproduced, so a data reproduction unit can be relatively easily constructed.

In FIG. 5 there is shown a specific format of the track address (TA). In the TA here, the track is divided into three blocks, each containing a synchronous idle character (SYNC) area, a track address (TA) area, and a cyclic redundancy check character (CRCC) area, and a preamble (PR) area and a postamble (PO) area are provided at the start and the end of the track, respectively.

Next, in FIG. 6 a recording method and a clock phase relationship are shown. In the recording method, assume that frequency modulation (FM or F2F) recording by a double clock signal is performed to convert a "0" data bit to 10 data bits and a "1" data bit to 11 data bits and, furthermore, non-return-to-zero (NRZ)-inverted (NRZI) recording is performed. At this time, if it is assumed that a write clock signal with respect to a "1" data bit in the track address (TA) data bits is a track address clock (TACK) signal, the recording cycle of data bits will be a double track address clock (2TACK) interval which is double the TACK interval by FM recording. Furthermore, since NRZI recording is performed, a "0" data bit is inverted at the track address clock (TACK) interval and a "1" data bit is continuously inverted twice at the double track address clock (2TACK) interval. Moreover, if the PR and PO data bits are all made 0's, then they will be repetitive data bits with a track address clock (TACK) interval. For secondary data such as a track address TA, recording and reproduction are performed not by a fast clock signal but by a relatively slower clock signal since no PLL is applied and some jitter occurs in reproduction.

In an actual detection method, data is sampled at double track address clock (2TACK) intervals and followed by the track address TA. If the synchronous idle character (SYNC) with a unique waveform which is not usually reproduced from other signals is detected, then the track address (TA) and the cyclic redundancy check character (CRCC) will be reproduced. With the CRCC, it is checked whether or not the SYNC contains an error. The waveform of SYNC is shown in FIG. 8. This waveform is obtained after FM recording and NRZI recording and is a relatively long unique pattern that is not detected from the PR, TA, or CRCC.

FIG. 11 shows how the track address (TA) is reproduced by a conventional method. Since reproduced data contains slight jitter between data bits, data is sampled at the rising and falling edges of the pulse of the double track address clock (2TACK) signal whose cycle is greater than an amount of jitter, as shown at 72 and 73. With this, if either cyclic redundancy check character (CRCC) contains no error by performing SYNC detection operations at 74 and 75, TA data detection operations at 76 and 77, and CRCC checking operations at 78 and 79, then it can be confirmed that the track address (TA) has been reproduced correctly.

As described above, in the recording and reproduction of data on an optical disk, there are two types of methods: a CLV method and a CAV method, and each method has advantages and disadvantages. For recording, the CLV method is superior to the CAV method in that data can be written with constant recording density over the entire disk surface. For reproduction, in the case where a recording/reproduction unit consists of a single head and produces a single output signal, the same CLV method may be employed. However, in the case where a recording/reproduction unit consists of a plurality of heads, when a multitude of output signals are made possible or an editing operation requiring the switching of a plurality of systems is performed, it is realized only by the CAV method in which the speed of a spindle motor is always constant and also searching is easy. The reason for this is that since the CLV method performs control of rotation in accordance with the position of a track at which a recording/reproduction head is positioned, the CLV method cannot make a plurality of heads active at the same time.

In order to utilize the respective advantages of the two methods, it is necessary that recording and reproduction can be performed between different methods. For example, it is necessary that the data on an optical disk recorded with the CLV method can be reproduced with the CAV method. In such a case, the frequency of recorded data will differ from that of reproduced data.

As previously described, in the case where recording and reproduction are performed with the same method, data of a frequency recorded is reproduced, and consequently, the data reproduction unit can be constructed relatively easily. However, in the case where data is recorded and reproduced with different methods, reproduced data differs in frequency from recorded data, and the data reproduction unit cannot be easily constructed. More specifically, in the case where data recorded with the CLV method is reproduced with the CAV method, the frequency of data to be reproduced will be higher than that of recorded data if the relative speed between the reproduction head and the optical disk is faster than that used during recording, and a lower reproduced frequency will be obtained if the relative speed is slower. Thus, the frequency varies between recording and reproduction, and furthermore, it is not easy to reproduce a frequency which varies gradually depending upon the position of the reproduction head.

While the aforementioned recording has been performed with a clock-locked signal, there is another method which records data with a variable clock signal so that a reproduced frequency becomes constant when reproduced. Thus, there are various methods for recording and reproduction, and circuitry which can record and reproduce data only by a predetermined method has hitherto been constructed.

SUMMARY OF THE INVENTION

It is an object of the present invention to provide data reproduction apparatus and method, which are capable of reproducing data with either one or the other of the CLV and CAV methods, by either the CLV method or the CAV method.

According to the present invention, there is provided a data reproduction unit for reproducing data from an optical disk, the optical disk having main data and secondary data independent of main data, recorded thereon, comprising reproduction means for reading out the recorded data by an arbitrary disk rotating method without intervention of a phase-locked loop circuit.

In detail, the data reproduction unit according to the present invention comprises means for computing an average of preamble data bits contained in the secondary data; means for setting a window value in accordance with the computed average, and means for detecting the data bits following the preamble data bits, based on the set window value.

Further objects and advantages of the present invention will become apparent from the following description of the preferred embodiments of the invention as illustrated in the accompanying drawings.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 4(A) is a schematic view showing how data is recorded on an optical disk by a constant linear velocity (CLV) method and the recorded data is reproduced from the opticak disk by the same CLV method;

FIG. 4(B) is a schematic view showing how data is recorded on an optical disk by a constant angular velocity (CAV) method and the recorded data is reproduced from the optical disk by the same CAV method;

FIG. 5 is a diagram showing the format of the track address TA;

FIG. 8 is a pattern diagram showing the waveform of the SYNC data bits contained in the track address TA;

FIG. 9 is a diagram showing the window values of SYNC data bits, a "0" data bit, and a "1" data bit obtained during CLV type clock-locked recording-CAV type reproduction;

FIG. 10 is a diagram showing the window values of SYNC data bits, a "0" data bit, and a "1" data bit obtained during CAV type clock-locked recording-CLV type reproduction.

DETAILED DESCRIPTION OF THE PREFERRED EMBODIMENTS

Figure 1:
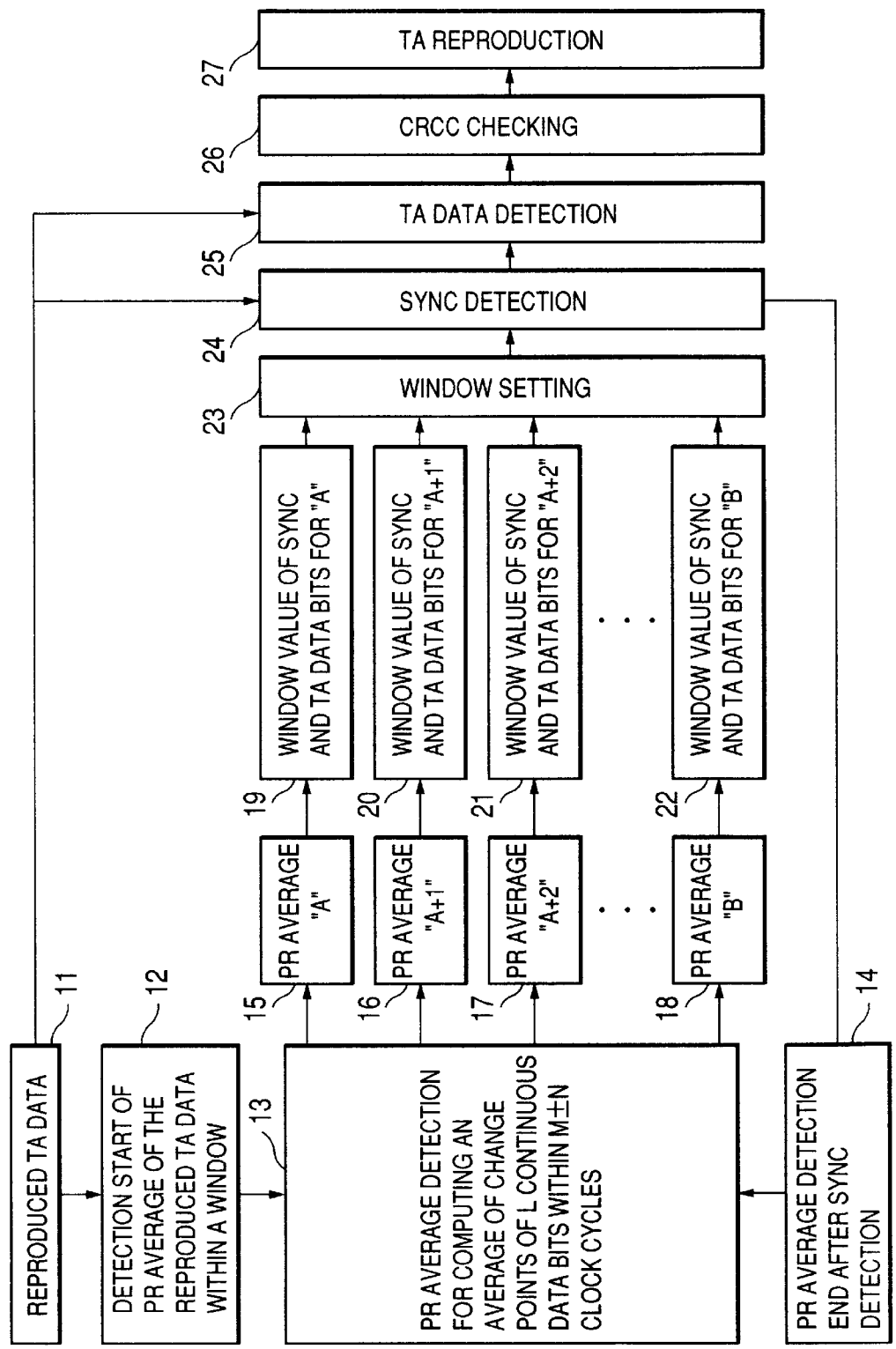
FIG. 1 is a block diagram showing how the PR average of the preamble (PR) data bits in a track address TA is detected according to the present invention to reproduce the track address TA.

As described in the aforementioned conventional example, data recorded with the CLV method is reproduced with the CLV method and data recorded with the CAV method is reproduced with the CAV method. In such cases, if a clock-locked signal is employed to record data, reproduced data of the same frequency as that used while recording can be obtained at any track on an optical disk when data is reproduced, as well. On the other hand, in the case where CLV type recording-CAV type reproduction or CAV type recording-CLV type reproduction is performed, both a clock-locked signal and a variable clock signal can be employed to record data.

For example, for data which is reproduced in the case of CLV type clock-locked recording-CAV type reproduction, a higher reproduced frequency than a recording frequency will be obtained if the relative velocity between a reproduction head and an optical disk becomes faster than that used while recording, and a lower reproduced frequency will be obtained if the relative velocity becomes slower. On the other hand, in the case of CLV type variable clock recording-CAV type reproduction, the recording clock signal is adjusted at the recording side so that an almost constant reproduced frequency is obtained even at any track on the optical disk when reproduced. Therefore, data is written in with a clock signal of a high frequency at the inner track side of the optical disk and with a clock signal of a low frequency at the outer track side.

Besides the aforementioned method, there is a CAV type locked-clock or variable clock recording method. For data which is reproduced in the case of CAV type clock-locked recording-CLV type reproduction, a higher reproduced frequency than a recording frequency will be obtained if the relative velocity between a reproduction head and an optical disk becomes faster than that used while recording, and a lower reproduced frequency will be obtained if the relative velocity becomes slower. On the other hand, in the case of CAV type variable clock recording-CLV type reproduction, the recording clock signal is adjusted at the recording side so that an almost constant reproduced frequency is obtained even at any track on the optical disk when reproduced. Therefore, data is written in with a clock signal of a low frequency at the inner track side of the optical disk and with a clock signal of a high frequency at the outer track side.

Thus, the CLV or CAV type clock-locked or variable clock recording-CLV or CAV type reproduction is rendered possible. It is most preferable that recording and reproduction can be performed even by any combination and also a required combination can be selected depending upon a recording/reproduction unit. In order to realize this, data must be reproduced correctly with respect to any recording. The operation will hereinafter be described.

As previously described, each track on an optical disk is usually constituted by a main data area for main data, such as video data, voice data, and system data, and a secondary data area for secondary data such as track address data representing an address of a track. For the main data, even data of any frequency can be reproduced via a PLL circuit. On the other hand, the secondary data is not long enough to be passed through a PLL circuit, because it is constituted by the minimum number of data bits. The present invention is one which relates to a method of reliably reproduction data which cannot be passed through a PLL circuit, such as track address data.

Now, the reproduction operation in the case of CLV type clock-locked recording to CAV type reproduction will be described with reference to an example of a track address (TA). Assume that, as with the conventional example, the track address (TA) is formatted as shown in FIG. 5. The recording method and the clock phase relationship are shown in FIG. 7. In the figure there is added an octuple track address clock (8TACK) signal that is faster than the double track address clock (2TACK) signal of FIG. 6 which is the minimum inverting interval of recording. If the CLV type clock-locked recording to CAV type reproduction is performed on the track address (TA) formatted as shown in FIG. 5, the means for sampling data only by a double track address clock (2TACK) signal as in the aforementioned conventional example will not be able to reproduce data correctly, because a reproduced frequency varies depending upon the position of a head over a track.

Hence, how the frequency of the track address (TA) structure of FIG. 5 varies is checked as follows. That is, the average value of the preamble (PR) data bits positioned at the start of the track is computed, and based on the average value, window values for detecting the following synchronous idle character (SYNC) data and track address (TA) data are prescribed. Based on the prescribed window values, the track address (TA) of FIG. 5 will be reproduced. FIG. 1 is a block diagram showing how the average value of the preamble (PR) data bits is detected according to the present invention to reproduce the track address (TA). As previously described, the inverting interval of a "0" data bit is the cycle of the track address clock (TACK) signal and the inverting interval of a "1" data bit is two continuous cycles in the double track address clock (2TACK) signal. In this embodiment, an octuple track address clock (8TACK) signal is further employed to sample the data of the track address (TA) of FIG. 5 reproduced. In the CAV type reproduction, the frequency of the data of the track address TA reproduced becomes high or low depending upon the position of the reproduction head. For this reason, where the frequency of reproduced data differs from that of recorded data, data is reproduced with the octuple track address clock (8TACK) signal, because data will not be able to be reproduced with the conventional double track address clock (2TACK) signal. In addition, finer clock cycles can compute the average value of the preamble (PR) data bits more finely.

For the inverting interval of the data bit of the track address (TA), if the data bits are sampled with the octuple track address clock (8TACK) signal, it will be found that a "1" data bit corresponds to the four clock cycles of the octuple track address clock (8TACK) signal and a "0" data bit to the eight clock cycles of the octuple track address clock (8TACK) signal. Therefore, in the case where recording is performed with the CLV type clock-locked signal and reproduction is performed with the same CLV method, the cycle of reproduced data is the same as that used during recording, and the phase change in the data bits of the track address (TA) reproduced can be previously known. This phase change is employed to provide a window so that the window corresponds to a range from one change point in the data bits of the track address (TA) reproduced to the next change point, and when a change point occurs within the window, it can be confirmed that data bit corresponding to that window has been detected. Thus, the detection of the data bits of the track address (TA) becomes possible. For the specific numerical value of the window, 7 to 9 is suitable for a "0" detecting window and 3 to 5 is suitable for a "1" detecting window. If a change point is detected within a window with a value of 7 to 9, it can be recognized that a "0" data bit has been reproduced. Similarly, if a change point is detected twice within a window with a value 3 to 5, it can be recognized that a "1" data bit has been reproduced.

However, in the case where data recorded with the CLV type clock-locked signal is reproduced by the CAV method, the entire frequency of the TA varies depending upon the position of the head over the track, so the inverting interval of each data bit constituting the TA cannot be defined with respect to the aforementioned octuple track address clock (8TACK) signal. Hence, the preamble (PR) data bits positioned at the start of the TA structure are utilized. If the preamble (PR) data bits (40 bits) are prescribed as 40 0's, the inverting intervals will be constituted by repetitive data of the clock cycle of the track address clock (TACK) signal. Now, if the average of change points in the preamble (PR) data bits with respect to the octuple track address clock (8TACK) signal (hereinafter referred to as "a PR average") is found, it can be analogized at how many clock cycles the "0" data bit and "1" data bit in the following SYNC and TA data bits change, respectively. With this analogy, a window value can be prescribed for detecting each of the data bits of the track address TA, and consequently, reproduction of the track address TA will be able to be reproduced.

Now, a reproduced-TA window is provided so that the phase of reproduced track address (TA) itself can be put within the reproduced-TA window, by the detection start of the PR average of reproduced TA data bits within a window (at 12). The PR average of the data bits of the track address (TA) itself is allowed to be performed only within the reproduced-TA window. The reason for this is that besides the data constituting the TA, various main data has been recorded and, therefore, if the average of the TA itself is computed using the main data, a correct average will not be able to be obtained. In addition, providing the reproduced-TA window can prescribe start of TA reproduction and reset circuitry.

The reproduced-TA window is set so as to be slightly wider than the phase of the track address TA reproduced, because the phase of the reproduced track address TA cannot be strictly defined due to the jitter in servo data. Therefore, when the reproduced TA has come into the reproduced-TA window, the entire phase of the reproduced TA has not been input yet. In this position, even if the PR average were computed, it would contain data other than the data of the track address TA. For this reason, the PR average is updated each time a new PR average is obtained.

The PR average is computed by an PR average detecting section 13 for computing an average of change points of L continuous data bits within M±N clock cycles (where L≦40 and N is an integer between 0 and M/2). Since the preamble (PR) data bits (40 bits) are all prescribed as 0's, repetitive data bits with the same frequency will continue for an interval of 40 bits. In the average detecting section 13, an average value of L data bits is computed.

For example, in the case where the change width of a current data bit has M clock cycles in the octuple track address clock (8TACK) signal, N clock cycles are added before and behind M clock cycles as an allowable range, because there is the possibility that a change point will slightly shift due to an influence of jitter. Whether or not the change point of the next data bit is within M±N clock cycles is checked. When the change point is not within M±N clock cycles, it is recognized that the checked data bits are not continuous preamble (PR) data bits. Next, the reset operation is performed and an average value is computed again. With this, the PR average of L bits can be computed. The computed PR average is input to a PR average A section 15, a PR average A+1 section 16, a PR average A+2 section 17, . . . , and to a PR average B section 18, then is input to corresponding window value sections 19 through 22 for SYNC and TA data bits, and is set to a window setting section 23. With this, windows for the following SYNC and TA data are prescribed.

After the detection of the PR average, reproduction of the track address TA data contained in the track address TA is performed. In order to reproduce the TA data, initially the SYNC data, positioned before the TA data, needs to be detected. Shown in FIG. 8 is an example of the SYNC data bit waveform. The SYNC data bits represent that they are followed by track address (TA) data bits. The SYNC data bits have a unique waveform so that they can be distinguished from the PR data bits and the TA data bits of the track address TA. In the SYNC pulse signal of this embodiment, the pulse is continuously inverted four times at intervals of ¼ of the cycle of the track address clock (TACK) signal. This SYNC signal is detected by a SYNC detecting section 24, and after SYNC detection, the detection of the PR average is ended by a PR average detection ending section 14. With this, there is no possibility that the PR average will be computed from the following TA data bits and it becomes possible to compute the PR average only from the PR data bits.

Now, the operation will be described with specific numerical values. First, for the waveform signals shown in FIGS. 6 and 8, the CLV type clock-locked recording to CAV type reproduction is performed over all tracks on an optical disk. Furthermore, assume that in the innermost track of the optical disk, reproduction is performed at the same linear velocity as that used in recording and, in the outermost track, reproduction is performed at twice the linear velocity used in recording. In FIG. 9 there are the window values for the SYNC data bits and the TA data bits which are determined from the preamble (PR) average value that is computed at this time. Now, assume that the PR average value at the innermost track has been 8.25 as a result of reproduced data samples having been taken with the octuple track address clock (8TACK) signal. The numeral 8.25 represents 8.25 clock cycles, and this holds true for the numerals thereafter. At this time, the PR average value is 8 from FIG. 9, and the change interval of the SYNC data bits and the change intervals of the "0" data bit and "1" data bit in the TA data bits become 32 (8×4), 8, and 4, respectively. If it is assumed that the allowable range of the window value for detecting a change point in data bits is ±2 for SYNC data bits and ±1 for TA data bits, then the window value for SYNC data bits will be 30 or more and less than 34. Also, the window value for a "0" data bit in the TA data bits will be 7 or more and less than 9, and the window value for a "1" data bit in the TA data bits will be 3 or more and less than 5.

The synchronous idle character (SYNC) data is data of a low frequency which cannot be obtained from the preamble (PR) data and track address (TA) data, and if a change point is continuously repeated four times between 30 or more and less than 34, the data bits can be thought of as SYNC data bits. If the SYNC data bits can be detected, then the detection of the PR average value will be ended and the detection of the TA data bits will be started. The TA data bits are detected by a TA data detecting section 25. In the TA data bit detection, if a change point occurs between 7 or more and less than 9, the data bit can be detected as a "0" data bit. Also, if a change point is continuously repeated twice between 3 or more and less than 5, the data bit can be detected as a "1" data bit. After the detection of the TA data bits, whether or not the detected TA data bits contain an error is checked by a cyclic redundancy check character (CRCC) checking section 26. If no CRCC error is detected, then it can be recognized that correct TA data bits have been reproduced by a TA reproduction section 27. In this way, the reproduction of the TA data becomes possible.

As previously described, the linear velocity of an outer track is faster than that of an inner track. For this reason, assume that the PR average value has become 6.75. At this time, the PR average value is 7 from FIG. 9, and the window value for detecting a change point in data bits becomes 26 or more and less than 30 for SYNC data bits, 6 or more and less than 8 for a "0" data bit, and 3 or more and less than 5 for a "1" data bit. Next, if the window values are computed from the inner track to the outer track, they will be prescribed as shown in FIG. 9. Finally, at the time the head position has arrived over the outermost track, assume that the PR average value became 3.75. At this time, the PR average value is 4, and the window value for detecting a change point in data bits becomes 14 or more and less than 18 for SYNC data bits, 3 or more and less than 5 for a "0" data bit, and 1 or more and less than 3 for a "1" data bit.

While data reproduction at the outermost track has been performed at twice the linear velocity used in recording, the window values for detecting a "0" data bit and a "1" data bit become smaller and narrower when reproduction is performed at more than twice the linear velocity. For example, when the PR average value is 3.3, the interval of data bit change in the TA data bits is 3.3 for a "0" data bit and 1.65 for a "1" data bit. In such a case, the window value becomes 2 or more, or 3 or more and less than 4 for a "0" data bit and 1 or more and less than 2, or less than 3 for a "1" data bit. The window value itself is desired to be set so as to be large, but the same window value cannot be set for both a "0" data bit and a "1" data bit. Therefore, in such a case, the window value can be set to 2 or more and less than 4 for a "0" data bit and 1 or more and less than 2 for a "1" data bit, or it can be set to 3 or more and less than 4 for a "0" data bit and 1 or more and less than 3 for a "1" data bit. Thus, the window value can be adaptively switched. It is also possible to finely detect the PR average by not one step but a plurality of steps to compute the window value.

In the aforementioned way, reproduction of the track address TA can be performed, by setting the window values for detecting the SYNC data bits and TA data bits from the aforementioned PR average value.

Figure 6:
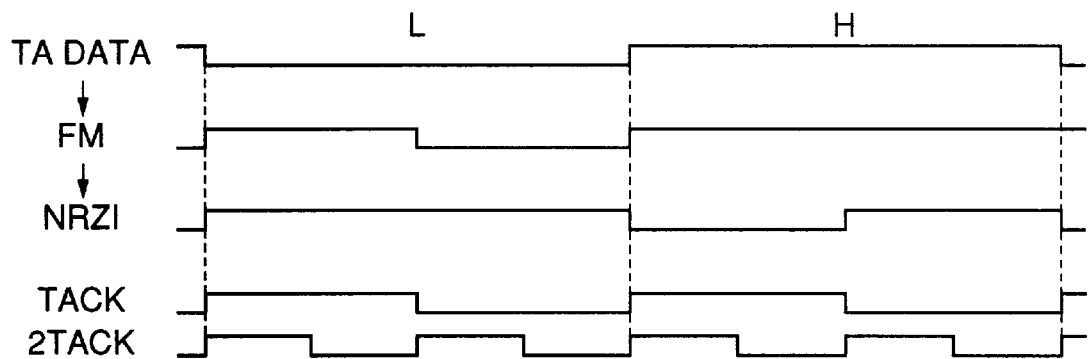
FIG. 6 is a timing diagram showing how the track address TA is modulated.
Figure 7:
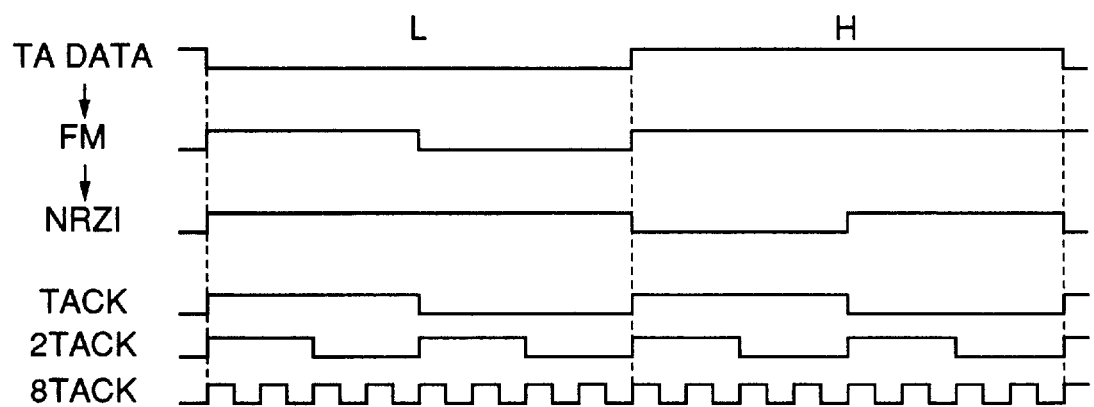
FIG. 7 is a timing diagram showing how the track address TA is modulated.
Figure 11:
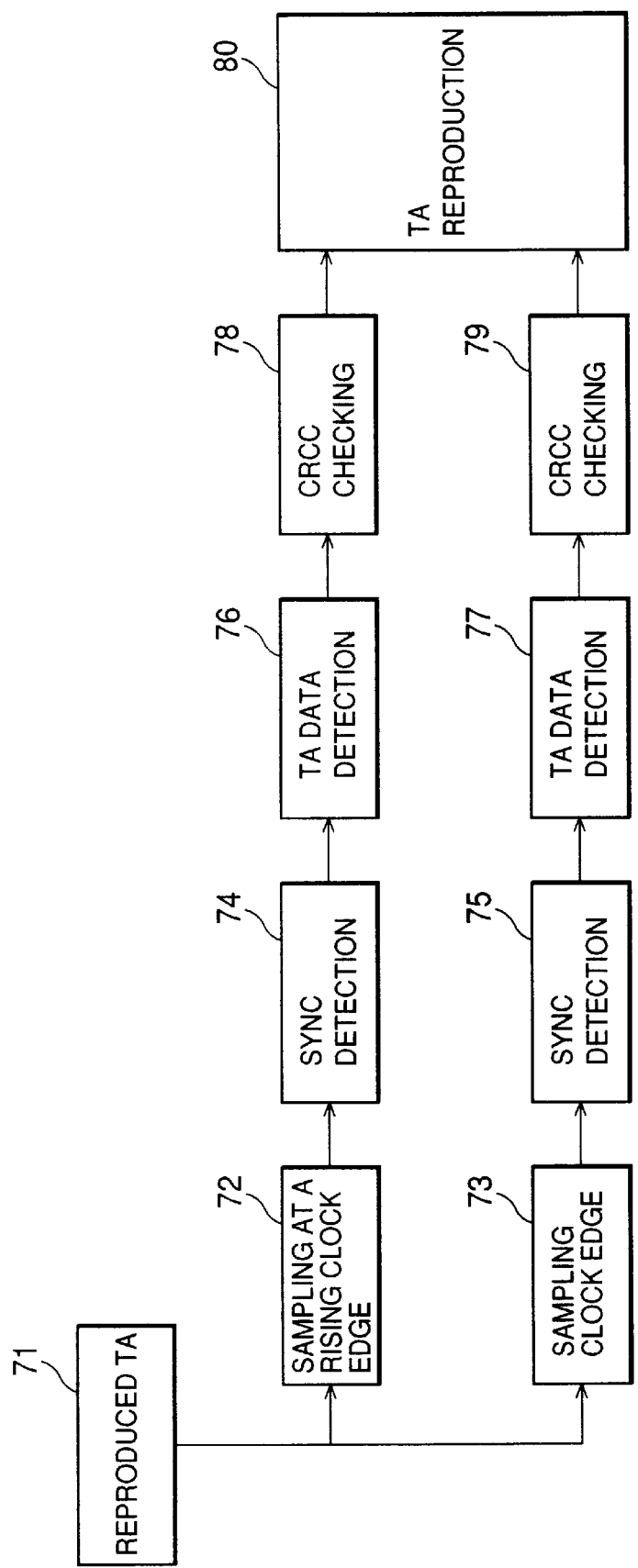
FIG. 11 is a block diagram showing how the track address TA is reproduced by a conventional method.

Now, for the waveforms shown in FIGS. 6 and 8, the CAV type clock-locked recording to CLV type reproduction will now be performed over all tracks on an optical disk as another embodiment of the present invention. Furthermore, assume that in the innermost track of the optical disk, reproduction is performed at the same linear velocity as that used while recording and, in the outermost track, reproduction is performed at half the linear velocity used in recording. In FIG. 10 there are shown the window values for the SYNC data bits and the TA data bits which are determined from the preamble (PR) average that is computed at this time. Now, assume that the PR average value has become 7.75. At this time, the PR average value is 8 from FIG. 10, and the window value for detecting a change point in data bits becomes 30 or more and less than 34 for SYNC data bits, 7 or more and less than 9 for a "0" data bit, and 3 or more and less than 5 for a "1" data bit. Next, if the window values are computed from the inner track to the outer track, they will be prescribed as shown in FIG. 10. Finally, at the time the position of a head has arrived over the outermost track, assume that the PR average value became 6.25. At this time, the PR average value is 16, and the window value for detecting a change point in data bits becomes 62 or more and less than 66 for SYNC data bits, 15 or more and less than 17 for a "0" data bit, and 7 or more and less than 9 for a "1" data bit.

Incidentally, when the allowable range of the window value is ±1, the allowable degree of the window value for the outer track of the disk become smaller compared with the inner track. Therefore, the setting of the allowable range can also be performed so that the allowable range for SYNC data bits, for example, is not ±1 but ±10%. In such a case, the window value for SYNC data bits becomes 58 or more (16×4×0.9=57.6) and less than 70 (16×4×1.1=70.4). Of course, the window value for the TA data bits may be prescribed in the same way. Thus, the window value can be adaptively switched.

In the aforementioned way, by setting the window values for detecting the SYNC data bits and TA data bits from the aforementioned PR average value, reproduction of the track address TA can be performed.

In the aforementioned embodiments, while frequency modulation (FM or F2F) has been shown, the present invention is also applicable to any other frequency-modulation methods. For example, in modified frequency modulation (MFM), the inverting interval becomes 2:3:4 compared with 1:2 for frequency modulation, and in such a case, it will suffice if the window value for the "1" data bit shown in FIGS. 9 and 10 is increased twice, thrice, and four times to obtain a new window value which is used in the case of MFM.

In addition, the reproduction clock signal is not necessarily the aforementioned octuple track address clock (8TACK) signal. For example, it may also be a 16-times track address clock (16TACK) signal. In such a case the number of clock cycles in FIGS. 9 and 10 is uniformly increased twice.

Figure 2:
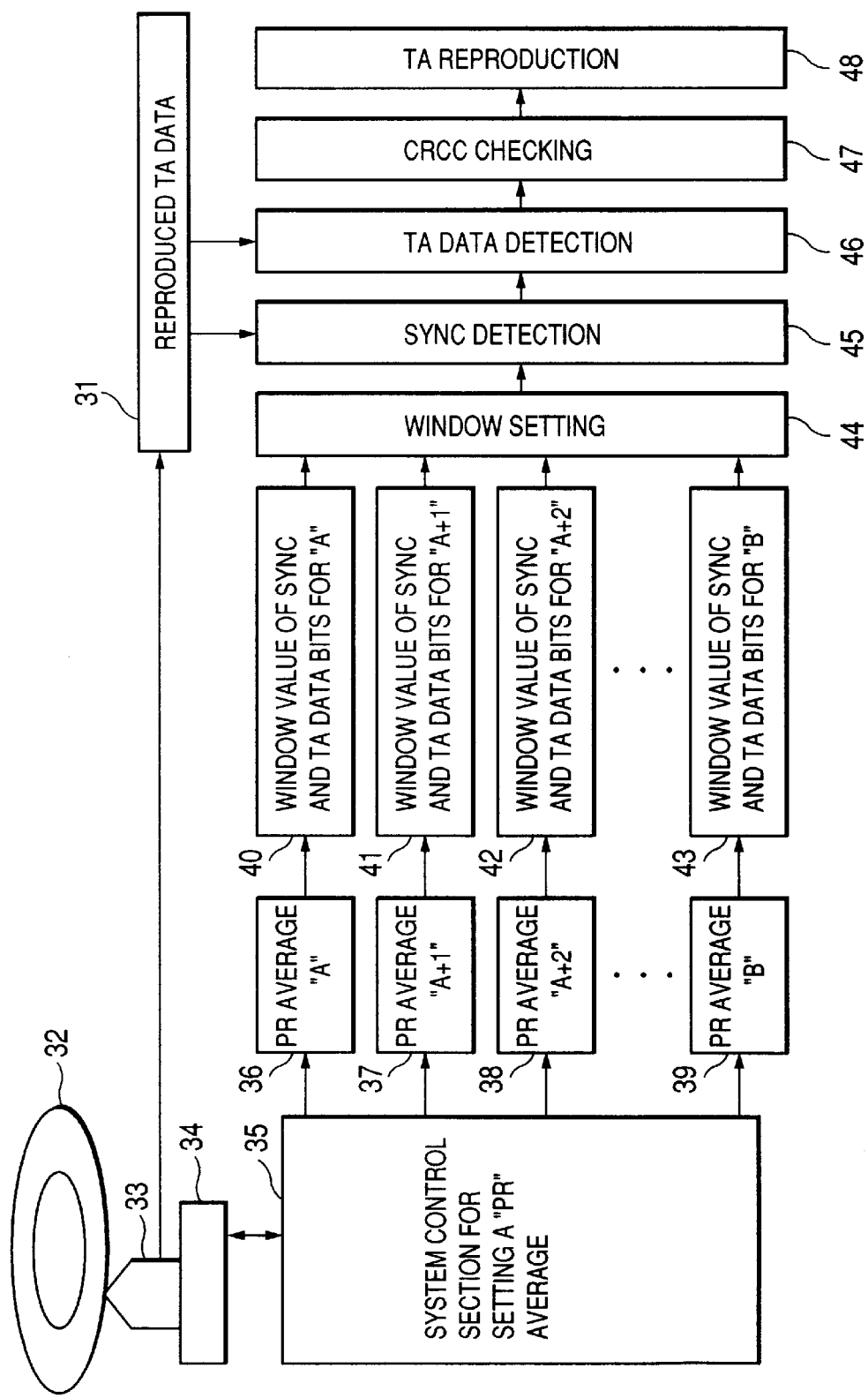
FIG. 2 is a block diagram showing how the system control section of the present invention sets the PR average of the preamble (PR) data bits in the track address TA to reproduce the track address TA.

As another method of reproduction the track address TA, there is a method in which a system control section transfers data about what value the PR average value takes. What shows this is FIG. 2. The differing point from FIG. 1 is that the PR average detecting section 13 in FIG. 1 is replaced with a system control section 35 which sets a PR average value. The data of the track address TA reproduced represents at which track a head is positioned, and for the position of the head over a track, the rough position can be prescribed by a positioner which controls the head position. If the head position and a method of writing data to an optical disk are found, the relative speed between the optical disk and the reproduction head can be computed, thereby being able to prescribe what value the PR average value takes. Thereafter, reproduction of the TA data can be performed in the same method as FIG. 1.

Figure 3:
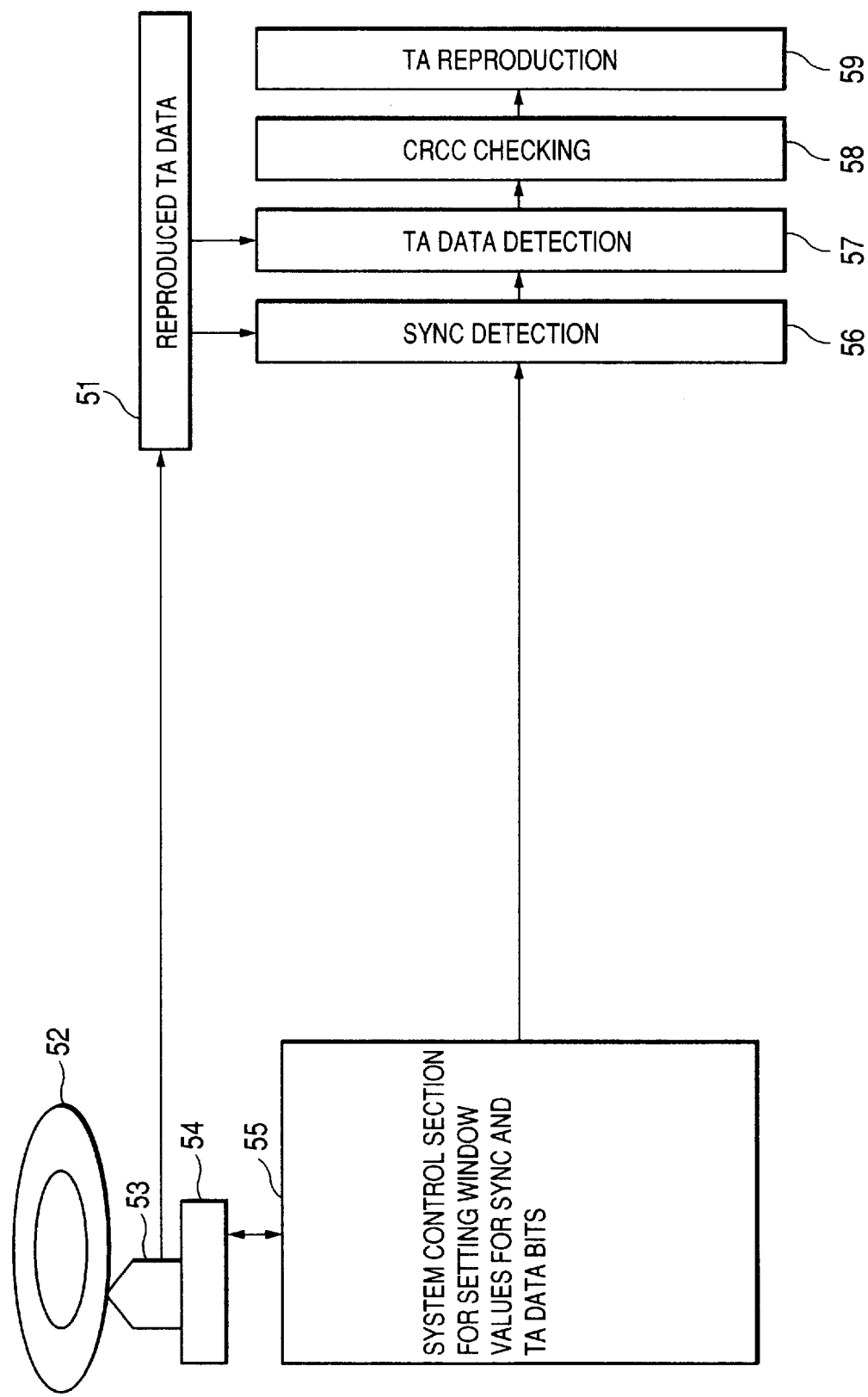
FIG. 3 is a block diagram showing how the system control section of the present invention sets window values used for the SYNC data bits and TA data bits in the track address TA to reproduce the track address TA.

Furthermore, there is a method in which the system control section sets the window values themselves of the SYNC data bits and TA data bits in the same way. Shown in FIG. 3 is this method. The differing point from FIG. 1 is that the setting of the window values for SYNC data bits and TA data bits is performed by a system control section 55 which sets window values for SYNC data bits and TA data bits. Even in this method, thereafter, reproduction of the track address TA can be performed in the same method as FIG. 1.

In the aforementioned embodiments, although the CLV type clock-locked recording-CAV type reproduction and the CAV type clock-locked recording-CLV type reproduction have been taken as examples, the present invention is also applicable to a combination of CLV type variable clock recording and CAV type reproduction and a combination of CAV type variable clock recording and CLV type reproduction. Even in these combinations, secondary data such as track address data can be reproduced with the same structure as the aforementioned.

In summary again, according to the present invention, the aforementioned reproduction means may comprise: means for setting data equivalent to an average of preamble data bits contained in the secondary data by a system control section in reproducing the secondary data recorded on the aforementioned optical disk, the preamble being recorded in a predetermined wavelength in the leading edge of the format of the secondary data, means for setting a window value for detecting data bits following the preamble data bits from the set data; and means for detecting the data bits following the preamble data bits, based on the set window value.

Further, the aforementioned reproduction means may also comprise: means for setting a window value for detecting data bits following preamble data bits contained in the secondary data by a system control section; and means for detecting the data bits following the preamble data bits, based on the set window value.

In a preferred form of the present invention, a window is provided so as to contain the preamble data bits when the average of the preamble data bits is computed, and an average of the data bits present within the window is computed.

The average of the preamble data bits may be determined if change points of L continuous bits are within M±N clock cycles of a reproduction sampling clock signal (where L is an integer of 1 or more, M is an integer of 1 or more and N is an integer of 0 or more and less than M/2), when computed.

The detection of the average of the preamble data bits may be ended if the same cycle as a cycle constructed in a format of the secondary data is detected, when computing the average of the preamble data bits.

In another preferred form of the present invention, the secondary data is sampled with a clock signal whose frequency is finer than the minimum inverting interval of the secondary data, when generated, and the secondary is detected by obtaining a change edge of the sampled secondary data.

In still another preferred form of the present invention, the secondary data is sampled with the clock signal when generated. From a change point of the sampled data a window is provided between S±T clock cycles of the clock signal (where S is an integer of 2 or more and T is an integer of S/2 or less), and data is detected when a change edge of the next data is obtained within the window.

For the aforementioned secondary data, data change widths of a "1" data bit and a "0" data bit are taken to be a and b. The data change width of the preamble data bits is taken to be c. The average change width, detected when the preamble data bits are reproduced, is taken to be x. A window with a width of ±d provided in a ratio of ((x/c)×a), that is, ((x/c)×a±d) is taken to be the windows width for detecting the "1" data bit. Also, a window with a width of ±d provided in a ratio of ((x/c)×b), that is, ((x/c)×b±d) is taken to be the window width for detecting the "0" data bit. With this, the secondary data is detected.

Also, for the secondary data, the data change widths of a "1" data bit and a "0" data bit may be taken to be 1 and 2. The data change width of the preamble data bits may be taken to be 2. The data change width of the preamble data bits ± one clock cycle of the clock signal may be taken to be the data change width of the "0" data bit, and the data change width of the preamble data bits/2±one clock cycle of the clock signal may be taken to be the data change width of the "1" data bit. With this, the secondary data is detected.

The aforementioned secondary data may be a track address.

As has been described hereinbefore, the present invention can reproduce data without having recourse to intervention of a PLL circuit, even in the case of any of the combinations of CLV type clock-locked or variable clock recording to CAV type reproduction, and CAV type clock-locked or variable clock recording to CLV type reproduction, by computing the PR average value and then determining the window values for SYNC data bits and TA data bits. With this, the data recorded on an optical disk, which could be reproduced only between units using the same recording/reproduction method, will be usable between units using different methods, and consequently, a data recording/reproduction unit utilizing the respective advantages of the aforementioned recording/reproduction methods is realizable.

While the subject invention has been described with relation to the preferred embodiments, various modifications and adaptations thereof will now be apparent to those skilled in the art. All such modifications and adaptations as fall within the scope of the appended claims are intended to be covered thereby.

What is claimed is:

1. A data reproduction apparatus for reproducing data from an optical disk, said optical disk having main data and secondary data independent of said main data recorded thereon, said data reproduction apparatus comprising:
reproduction means for reading out the recorded secondary data without intervention of a phase-locked loop circuit, said reproduction means comprising:
means for computing an average of preamble data bits contained in said secondary data;
means for setting a window value in accordance with the computed average; and means for detecting said data bits following said preamble data bits, based on the set window value, wherein the average of said preamble data bits is determined if change points of L continuous bits are within M±N clock cycles of a reproduction sampling clock signal (where L is an integer of 1 or more, M is an integer of 1 or more and N is an integer of 0 or more and less than M/2), when computed.

2. A data reproduction apparatus as set forth in claim 1, wherein detection of the average of said preamble data bits is ended if the same cycle as a cycle constructed in a format of said secondary data is detected, when computing the average of said preamble data bits.

3. A data reproduction apparatus as set forth in claim 1, wherein, said secondary data is sampled with a clock signal whose frequency is finer than a minimum inverting interval of said secondary data when generated, and said secondary data is detected by obtaining a change edge of the sampled secondary data.

4. A data reproduction apparatus as set forth in claim 1, wherein said secondary data includes a sync and a track address and said window value setting means further sets window values for said sync and track address.

5. A data reproduction apparatus as set forth in claim 1, wherein said window value is varied in accordance with a reproduction point on said optical disk.

6. A data reproduction apparatus for reproducing data from an optical disk, said optical disk having main data and secondary data independent of said main data recorded thereon, said data reproduction apparatus comprising:
reproduction means for reading out the recorded secondary data without intervention of a phase-locked loop circuit, wherein:
said secondary data is sampled with a clock signal whose frequency is finer than the minimum inverting interval of said secondary data, when generated, and said secondary data is detected by obtaining a change edge of the sampled secondary data;
from a change point of the sampled data, a window is provided between S±T clock cycles of said clock signal (where S is an integer of 2 or more and T is an integer of S/2 or less); and
data is detected when a change edge of the next data is obtained within said window.

7. A data reproduction apparatus for reproducing data from an optical disk, said optical disk having main data and secondary data independent of said main data recorded thereon, said data reproduction apparatus comprising:
reproduction means for reading out the recorded secondary data without intervention of a phase-locked loop circuit, said reproduction means comprising:
means for computing an average of preamble data bits contained in said secondary data;
means for setting a window value the computed average; and
means for detecting said data bits following said preamble data bits, based on the set window value, wherein, for said secondary data:
data change widths of a "1" data bit and a "0" data bit are taken to be a and b;
a data change width of said preamble data bits is taken to be c;
an average change width, detected when said preamble data bits are reproduced, is taken to be x;
a window with a width of ±d provided in a ratio of ((x/c)×a), that is, ((x/c)×a±d) is taken to be the window width for detecting the "1" data bit; and a window with a width of ±d provided in a ratio of ((x/c)×b), that is, ((x/c)×b±d) is taken to be the window width for detecting the "0" data bit, whereby said secondary data is detected.

8. A data reproduction apparatus as set forth in claim 7, wherein, data change widths of a "1" data bit and a "0" data bit are taken to be 1 and 2;

a data change width of said preamble data bits is taken to be 2;

the data change width of said preamble data bits±one clock cycle of a clock signal is taken to be the data change width of said "0" data bit, said clock signal having a frequency being finer than the minimum inverting interval of said secondary data; and the data change width of said preamble data bits/2±one clock cycle of said clock signal is taken to be the data change width of said "1" data bit, whereby said secondary data is detected.

* * * * *